United States Patent [19]
Kirsch

[11] 3,760,663
[45] Sept. 25, 1973

[54] UNIVERSALLY ADJUSTABLE BOX TOOL

[76] Inventor: Robert J. Kirsch, 18501 Biltmore, Detroit, Mich. 48285

[22] Filed: June 12, 1972

[21] Appl. No.: 261,699

[52] U.S. Cl. .................................................. 82/35
[51] Int. Cl. ........................................... B23b 29/20
[58] Field of Search ............................. 82/35, 72, 73

[56] References Cited
UNITED STATES PATENTS

| | | | |
|---|---|---|---|
| 3,309,951 | 3/1967 | Patt ......................................... | 82/35 |
| 2,601,716 | 7/1952 | Laningham ........................ | 82/35 X |
| 2,415,714 | 2/1947 | Twamley ............................ | 82/35 X |
| 1,906,100 | 4/1933 | Richardson ............................ | 82/35 |

Primary Examiner—Leonidas Vlachos
Attorney—Donnelly, Mentag and Harrington

[57] ABSTRACT

A roller box tool for use with screw machines, turret lathes and other turning machine tools. The box tool comprises a body member having a pair of rollers which are carried on roller carrier arms that are slidably mounted in angular slots for inward and outward adjustments movements. A cutting tool is adjustably mounted on a tool carrier arm which is slidably mounted in an angular slot for adjustment inwardly and outwardly. The tool includes a rotatable adjusting spool which carries a barrel dial, whereby the carrier arms carrying the rollers and cutting tool may be adjusted inwardly and outwardly for adjusting the rollers and cutting tool to a pre-set size. A clamping sleeve is threadably mounted on the body member for retaining the roller carrier arms and tool carrier arms in desired adjusted positions.

5 Claims, 15 Drawing Figures

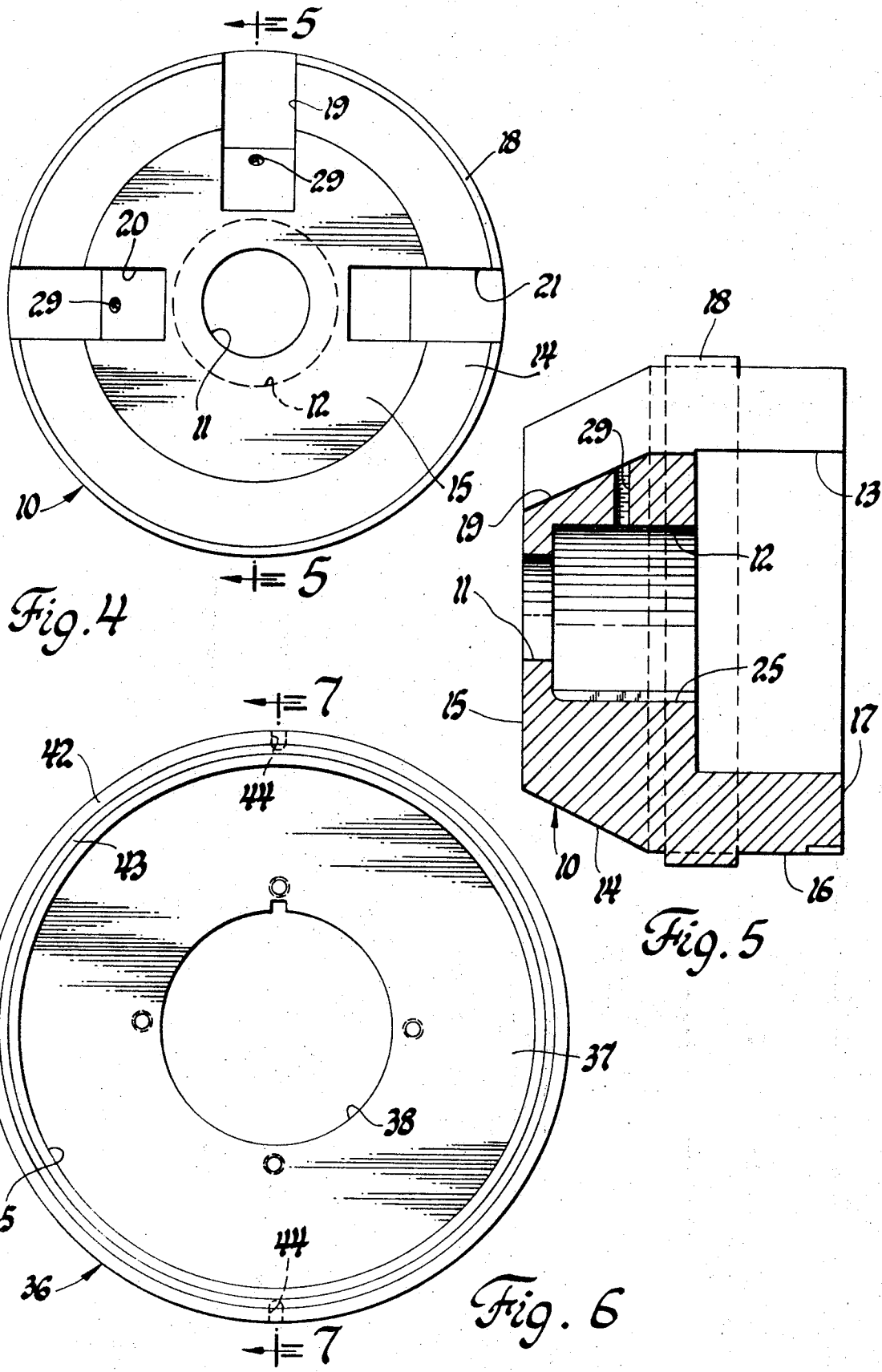

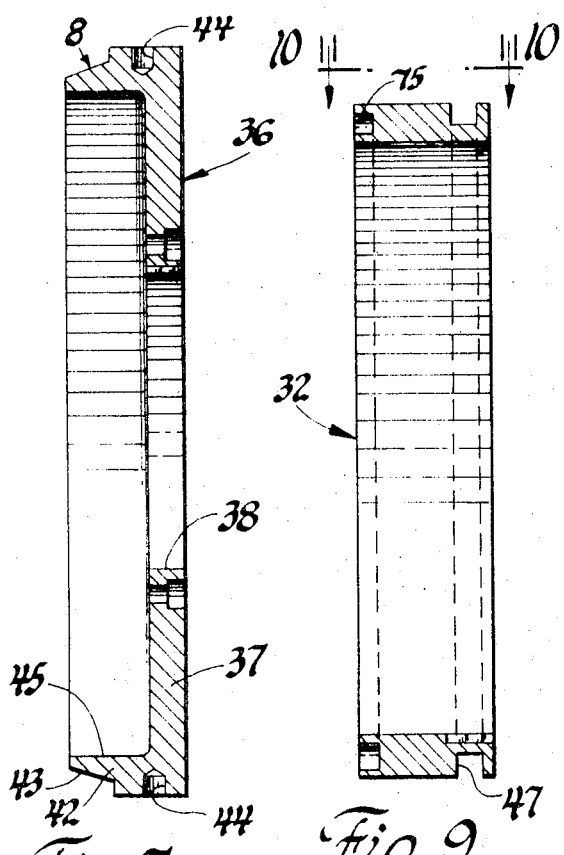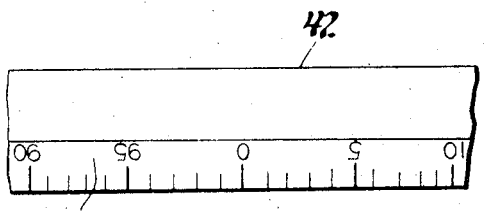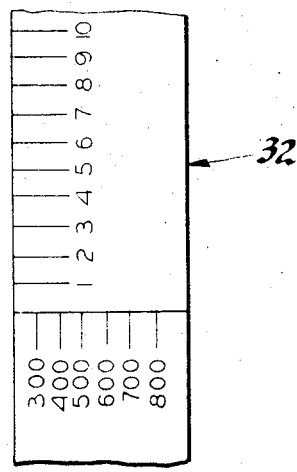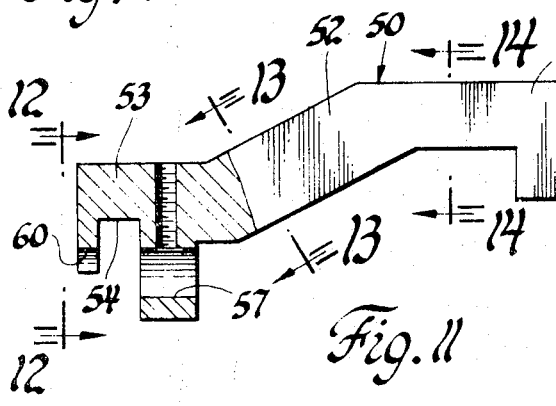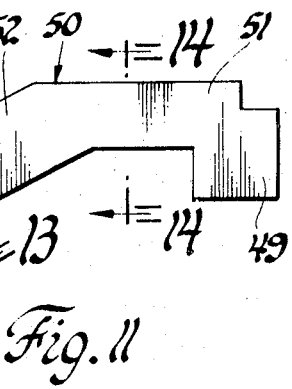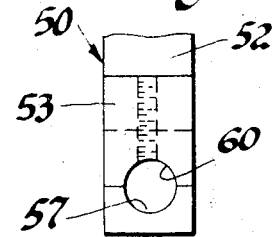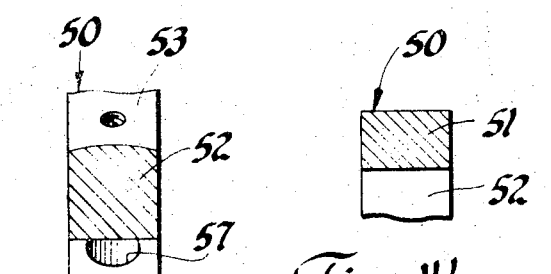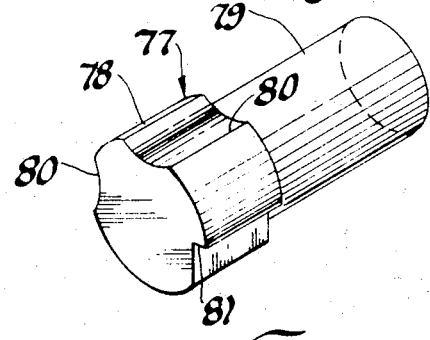

3,760,663

UNIVERSALLY ADJUSTABLE BOX TOOL

SUMMARY OF THE INVENTION

This invention relates to the turning tool art and more particularly to a novel and improved roller box tool for turning cylindrical work to a definite size.

It is an object of this invention to provide a novel and improved roller box tool for use with screw machines, turret lathes, and other turning machine tools.

It is another object of the present invention to provide a roller box tool which includes a pair of rollers and at least one tool bit which may be simultaneously adjusted to a precision diameter. The tool can be pre-set to a given size on a workbench, which allows its use as a standby tool on tape controlled equipment. The tool can also be automated for adjustment.

It is another object of the present invention to provide a novel and improved roller box tool for direct reading within the range of the tool sizes, and wherein the tool setting can be read to four decimal places.

It is still another object of the present invention to provide a novel and improved roller box tool which is simple and compact in construction, economical to manufacture and efficient in operation, and which substantially reduces the tool set-up time, together with accuracy. The tool can be totally disassembled in a minimum of time, and the interior mechanism thereof is sealed to prevent contamination from metal chips, dirt, and the like.

It is still a further object of the present invention to provide a novel and improved roller box tool which employs the use of angled planes disposed at a predetermined angle for adjustment of the rollers and tool bits to provide simultaneous adjustment of the rollers and tool bits in small increments of adjustment as, for example, 0.001 inch for every corresponding movement of an adjusting spool. The tool bits and rollers may be pre-set by the use of a plug gage, whether the tool is in a machine or on a bench.

It is another object of the present invention to provide a roller box tool which includes a cylindrical body member, a tubular shaft mounted on said cylindrical body, a pair of roller carrier arms slidably mounted on said body on a predetermined angular surface, a tool bit carrier arm slidably mounted on said body on a predetermined angular surface, micrometer adjustment means operatively mounted on said body for adjusting said carrier arms to adjust the setting of the rollers and tool bit, and clamping means for clamping said arms in an adjusted position.

Other objects, features and advantages of this invention will be apparent from the following detailed description, appended claims, and the accompanying drawings.

BRIEF DESCRIPTION OF THE DRAWINGS

FIG. 4 is a front elevational view of the box tool body member employed in the illustrative embodiment.

FIG. 5 is an elevational, section view of the structure illustrated in FIG. 4, taken along the line 5—5 thereof, and looking in the direction of the arrows.

FIG. 6 is an inside elevational view of the micrometor adjustment barrel employed in the illustrative structure.

FIG. 7 is an elevational, section view of the structure illustrated in FIG. 6, taken along the line 7—7 thereof, and looking in the direction of the arrows.

FIG. 8 is a fragmentary view of the graduated barrel dial of the barrel structure of FIGS. 6 and 7, looking in the direction of the arrows marked "8" in FIG. 7;

FIG. 9 is an elevational, section view of the vernier ring structure employed in the illustrative embodiment of the invention.

FIG. 10 is a fragmentary view of the graduations on the outer surface of the vernier ring, taken along the line 10—10 of FIG. 9, and looking in the direction of the arrows.

FIG. 11 is a side elevational view of a roller carrier arm employed in the illustrative embodiment of the invention.

FIG. 12 is a front elevational view of the structure illustrated in FIG. 11, taken along the line 12—12 thereof, and looking in the direction of the arrows.

FIGS. 13 and 14 are elevational, section views of the structure illustrated in FIG. 11, taken along the line 13—13 and 14—14 thereof, and looking in the direction of the arrows.

FIG. 15 is an elevational, perspective view of a plug gage employed for setting the rollers and cutting tool on the box tool of the present invention.

DESCRIPTION OF THE PREFERRED EMBODIMENTS

Figure 3:
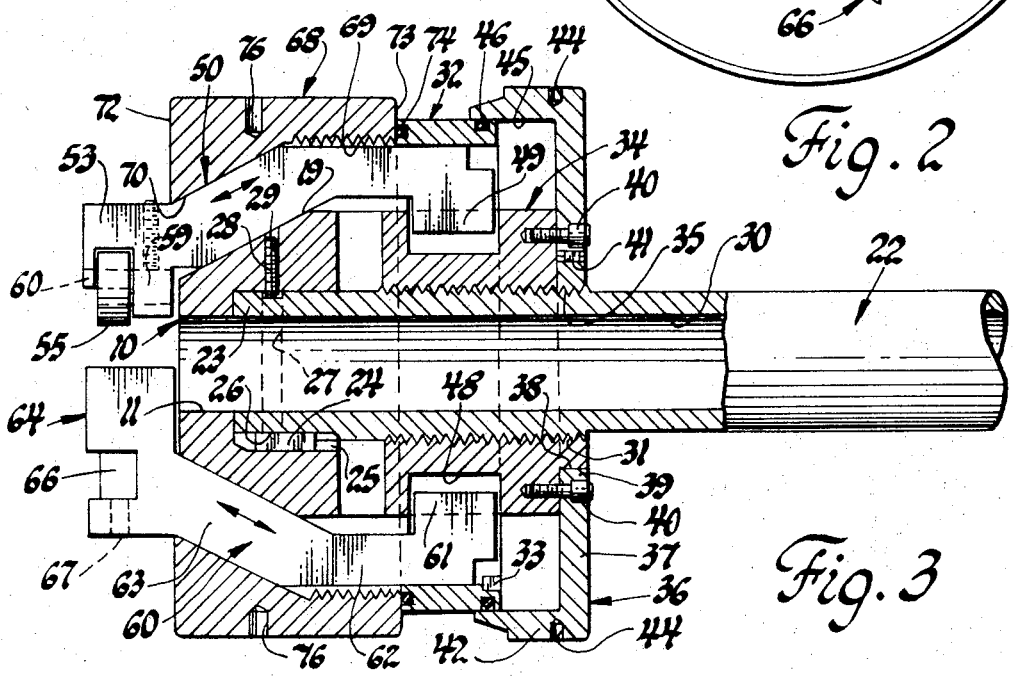
FIG. 3 is a longitudinal section view of the structure illustrated in FIG. 2, taken along the line 3—3 thereof, and looking in the direction of the arrows.

Referring now to the drawings and in particular to FIGS. 3, 4 and 5, the numeral 10 generally designates the cylindrical body of an illustrative roller box tool made in accordance with the principles of the present invention. As shown in FIG. 5, the body 10 is provided with a stepped, axial bore formed by a first small bore 11 in the front end of the body 10, an enlarged intermediate bore 12, and a further enlarged bore 13 formed in the rear end of the body 10. A tapered nose is provided on the front end of the body 10 and it has a converging surface 14 which is formed at an angle of 26° 34′ from the longitudinal peripheral surface of the body 10. The numeral 15 designates the front face of the body 10, and it is formed perpendicular to the longitudinal axis of the body 10. The numeral 11 designates the smooth peripheral surface of the rear end of the body 10, and it terminates at the transverse rear face 17. The body 10 is provided with a threaded ring portion 18 on the outer surface at the forward end of the surface 16 and at a point rearwardly of the converging nose or front end portion 14.

As shown in FIG. 4, the body 10 is provided with a pair of longitudinally disposed slots 19, 20 and 21 which are spaced 90° apart and which are precision ground with an inner surface coverging angle of 26° 34′. The slots 19, 20 and 21 are substantially rectangular in cross section.

As shown in FIG. 3, the box tool of the present invention is provided with an axial shaft or shank generally indicated by the numeral 22 which has its forward end 23 press-fitted into the intermediate stepped bore portion 12 in the body 10. The shaft 22 is also retained in the body 10 by a suitable key 24 which is operatively mounted in the key slots 25 and 26 formed in the body 10 and shaft 22, respectively. The shaft 22 is further secured to the body 10 by a plurality of lock screws 28 which are threadably mounted in suitable threaded bores 29 formed through the front end of the body 10 and which engage the shaft 22 in a single screw groove 27 formed in the outer periphery of the shaft front end portion 23. The shaft 22 is provided with an axial bore 30 which extends therethrough and which is coaxial with the bore 11 in the body 10.

The shaft 22 is provided with a threaded, peripheral portion 31, as shown in FIG. 3, on which is threadably mounted an adjusting spool generally indicated by the numeral 34. The spool 34 is provided with an axial, threaded bore 35 which receives the shaft threaded portion 31. The adjusting spool 34 carries an adjusting barrel and dial member generally indicated by the numeral 36, as shown in FIGS. 3, 6 and 7. The adjusting barrel and dial 36 include a transverse plate portion 37 which is provided with a circular, axial opening 38 which is seated on a circular shoulder 39 formed on the rear end of the adjusting spool 34. The adjusting barrel and dial member 36 is fixedly secured to the adjusting spool 34 by any suitable means, as by a plurality of machine screws 40 and a lock key 41.

The adjusting barrel and dial member 36 includes an integrally formed longitudinally extended cylindrical flange or barrel body portion 42, which is provided with an inwardly tapered peripheral outer face on which is formed a plurality of 100 equally graduated increments, as illustrated in FIGS. 7 and 8. The flange 42 is provided with a plurality of spanner wrench holes 44 as shown in FIGS. 3 and 7.

As shown in FIG. 3, the inner surface 45 of the flange 42 is adapted to slidably engage the outer surface of the vernier ring 32. The last mentioned surfaces are sealed by a suitable O-ring 46 which is operatively mounted in a peripheral groove 47 mounted in the outer surface of the vernier ring 32.

As shown in FIG. 3, the adjusting spool 34 is provided with a peripheral groove 48 in which is slidably mounted each of the radially extended rear end portions 49 of the two roller carrier arms which are indicated by the numeral 50. As shown in FIG. 11, each of the roller carrier arms 50 includes a longitudinally extended portion 51 which has its rear end integrally connected to the radial portion 49 and its front end integrally connected to the forwardly and inwardly sloping portion 52. The roller carrier arm 50 has an outer peripheral curved surface, as shown in FIG. 13, which is complimentary with the outer curved surface 14 of the body member 10. Integrally formed on the outer end of the sloping arm portion 52 is the roller head carrier portion 53.

As shown in FIGS. 11 and 12, the roller head carrier portion 53 is provided with a roller slot 54, formed through the inner side thereof, and in which is operatively mounted a roller 55 that is rotatably mounted by any suitable means on a roller shaft 56.

As shown in FIG. 3, the inner end of the shaft 56 is secured in a circular hole 57 in the roller head carrier portion 53 by any suitable means, as by a lock screw 58. The outer end portion 59 of the shaft 56 is half-round and this half-round shaft portion is seated in the half-round recess 60 formed in the roller head carrier portion 53.

As shown in FIG. 3, the tool bit carrier arm is generally designated by the numeral 60 and it is shaped identical to the roller carrier arms 50. The numeral 61 indicates the radial inwardly extended portion of the tool carrier arm 60 which is slidably mounted in the adjusting spool groove 48. The tool carrier arm portion 61 is integral with the longitudinally extended integral portion 62. The tool carrier portion 62 is integral with the inwardly sloping portion 63 which is slidably mounted in the tapered slot 21. Integrally formed in the outer end of the tool carrier portion 63 is a suitable tool bit holder or tool head 64. The tool bit holder 64 is provided with a tool bit slot 65 which is formed parallel to the roller carrier arm slot 19. A suitable tool bit as 66 is operatively fixed in the slot 65 by any suitable means, as by a pair of set screws 67, shown in FIG. 2.

Figure 1:
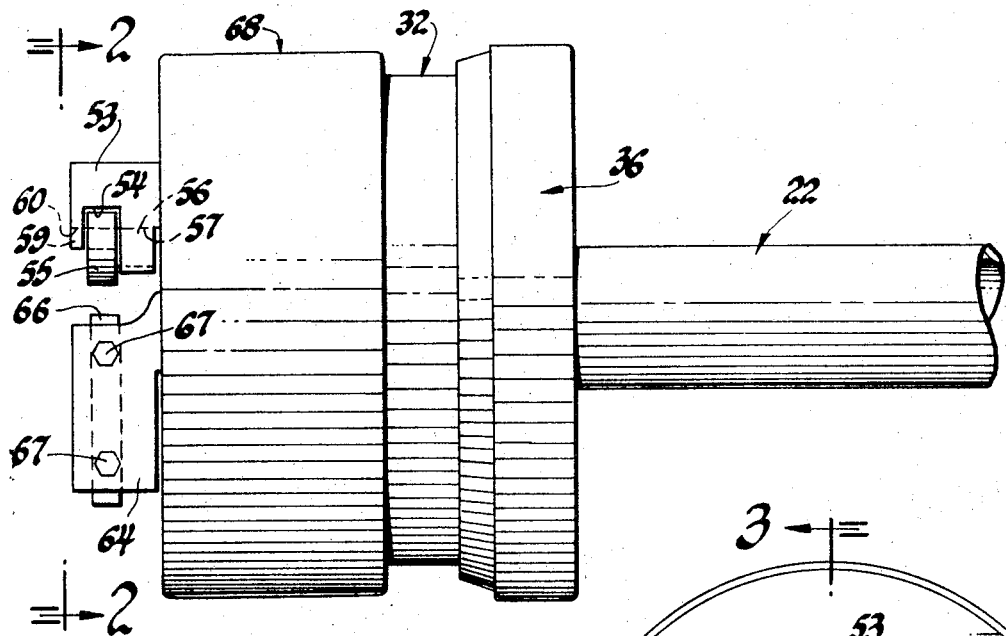
FIG. 1 is a side elevational view of a roller box tool made in accordance with the principles of the present invention.
Figure 2:
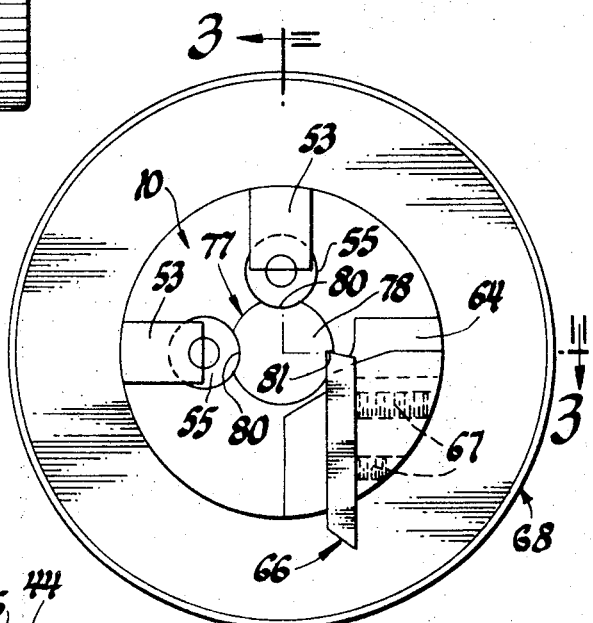
FIG. 2 is a front elevational view of the structure illustrated in FIG. 1, taken along the line 2—2 thereof, and looking in the direction of the arrows.

As shown in FIGS. 1, 2 and 3, the roller carrier and tool carrier arms are clamped in an adjusted position by a clamping sleeve generally indicated by the numeral 68. As best seen in FIG. 3, the clamping sleeve 68 is provided with an axial bore therethrough which includes a first threaded portion 69 in the rear end of the sleeve and a second smooth and converging portion 70 which terminates at the opening 71, as shown in FIG. 2, at the front face 72 of the clamping sleeve. The threaded bore portion 69 terminates at the rear face 73 of the clamping sleeve. The front and rear faces 72 and 73, respectively, of the clamping sleeve 68 are perpendicular to the longitudinal axis of the box tool. As shown in FIG. 3, the clamping sleeve rear face 73 abuts against a suitable O-ring 74 mounted in an O-ring groove 75 (FIG. 9) formed in the front face of the vernier ring 32. The O-ring 74 helps to seal out foreign matter such as metal chips and very fine dust and powder. As shown in FIG. 3, the clamping sleeve 68 is provided with a plurality of spanner wrench holes 76. The clamping sleeve 68 slides over the projecting roller carrier arms and the tool carrier arm and it is threaded in place on the threaded annular portion 18 of the body member 10 so as to clamp said carrier arms tightly in their respective slots and provide support for all three carrier arms with a minimum amount of carrier arm overhang.

The various parts of the roller box tool of the present invention may be made from any suitable material, and they are ground and precision finished.

FIG. 15 illustrates a plug gauge, generally indicated by the numeral 77, which can be used to preset the tool bit 66 precisely on the horizontal centerline of the tool, whether the tool is in a machine or on a bench. The numeral 78 designates a cylindrical gauge head which is integral with a support shaft or shank 79. The gauge head 78 has formed therein at 90° spaced apart positions a pair of concave recesses 80, and a shoulder cut 81 for locating the tool bit 66.

In use, the roller box tool of the present invention may be operatively mounted on the work carrying spindle of a screw machine, turret lathe and the like. Horizontal centerline adjustment of the tool bit 66 can then be determined when the box tool is mounted on a machine by rotating the clamping sleeve 68 in the proper direction to loosen the roller carrier arms and the tool carrier arm to permit adjustment of these arms. The micrometer barrel and dial member 36 is then rotated in the proper direction to move the carrier arms inwardly to expand the rollers and tool bit to permit the shank 79 of the plug gauge 77 to be slipped into the inner diameter of the shaft 22. The barrel and dial member 36 is then adjusted so as to move the rollers 55 toward the tool horizontal centerline until they rest in the concave recesses 80 in the plug gauge 77. The tool bit 66 is then slid inwardly in the slot 65 until its cutting edge engages the shoulder cut 81 in the plug gauge 77, at which point it is in the automatic dead center location. The set screws 67 are then tightened to hold the tool bit 66 in the preset adjusted position. The tool bit 66 is thus set tangent to the same diameter as the rollers 55 and the operator cannot alter the radial tangent position of the tool bit 66 relative to the rollers 55. Thereafter, when adjusting the position of the tool bit carrier arm for various diameter cuts, the rollers and tool bit will be moved simultaneously to maintain their preset relationship. The tool bit 66 is top face ground only when resharpening is required.

During a size adjusting operation, following the original preset operation, the clamping sleeve 68 is kept loose until the rollers and tool bit approach within 0.010 or 0.015 inches of the desired diameter. The clamping sleeve 68 is then snugged so that as the micrometer barrel and dial 36 is turned, any backlash would be at the proper thrust relationship. After the tool bit 66 is brought into the desired diameter, less 0.001 inch or 0.002 inch, a first trial cut is taken, and the final size setting then is made based on the trial cut or based on the tolerance. The final setting is made at this time. It will be seen that the rollers 55 and the tool bit 66 are simultaneously adjusted to a precision diameter.

The box tool of the present invention may be made to any desired size or in a range of sizes. As for example, the box tool may have a range of from ⅜ inch to ¾ inch adjustment. The next size of the tool would grow in diameter or would be of a larger diameter in accordance with the range of the desired adjustment. For example, a range of tools could have increasing diameters by increments of 0.375 inch. That is, one tool may have a range of from ¾ inch to 1⅛ inches, have a 4 3/16 inches overhand and be 5⅞ inches in diameter. The next size could have a range of from 1⅛ inches to 1½ inches and the overhang could still be 4 3/16 inches, but the diameter could be 6¼ inches. However, it will be understood that the box tool of the present invention may be made to any desired size.

It will be seen that the roller box tool of the present invention is a universally adjustable, direct reading box tool and that it can be directly read within the range of tool size. The tool setting can be read to four decimal places. The tool can be preset to a given size on the bench which allows its use as stand-by tooling on tape controlled equipment and it can be automated for adjustment. The tool is sealed with the O-rings 46 and 74 to keep the interior of the tool from being contaminated by metal chips, fine dust and other dirt. The tool can be totally disassembled in a minimum of time.

Because of the use of inclined planes at 26° 34 minutes, for every 0.001 inch axial movement of the adjusting spool 34, the diameter tangent to the two rollers 55 and the tool bit 66 is changed by 0.001 inch so as to provide simultaneous adjustment of the rollers and tool bit. The clamping sleeve 68 locks the roller carrier arms and tool carrier arm in a rigid position. FIG. 3 shows the tool bit 66 backed off to the maximum diameter. The micrometer barrel and dial member 36 is keyed in place to the adjusting spool 34 so that the zero point on the barrel dial will register at the "zero position" on the vernier ring 32 when the rollers 55 and the tool bit 66 are at diameters equal to 0.300 inch, 0.400 inch, 0.500 inch, 0.600 inch and 0.700 inch. As the turned diameter is adjusted larger and smaller, the tool bit 66 and the rollers 55 also move a corresponding amount, that is for each 0.001 inch axial outward movement of the adjusting spool 36, the turned diameter changes 0.001 inch and the tool bit 66 and the rollers 55 move inward 0.001 inch. Accordingly, in using the box tool of the present invention, the diameter to be turned is established first, and then the length of the cut is established.

While it will be apparent that the preferred embodiment of the invention herein disclosed is well calculated to fulfill the objects above stated, it will be appreciated that the invention is susceptible to modification, variation and change.

What is claimed is:

1. A roller box tool for use with machine tools, comprising:
    a. a cylindrical body having a front end and a rear end and having an axial bore therethrough;
    b. a tubular shaft operatively mounted on the rear end of said cylindrical body;
    c. a plurality of roller carrier arms slidably mounted on the front end of said body in circumferentially spaced apart, longitudinally extended, slots which have inner surfaces that converge toward each other at the front end of the cylindrical body at a predetermined angle, and on which said carrier arms are supported;
    d. at least one tool bit carrier arm slidably mounted on the front end of said body in a longitudinally extended slot circumferentially spaced apart from said roller carrier arm slots, and which last named slot has an inner surface that converges towards the front end of the cylindrical body towards the inner surfaces of said first named slots and on which is slidably mounted said tool carrier arm;
    e. each of said roller carrier arms having rotatably mounted on the outer end thereof a workpiece engaging roller, and said tool bit carrier arm having a tool bit adjustably mounted on the outer end thereof;
    f. means operatively mounted on said shaft for longitudinally moving said carrier arms for radially adjusting said carrier arms inwardly and outwardly relative to the horizontal centerline of the box tool to adjust the rollers and tool bit for cutting various diameters on workpieces; and,
    g. means for locking said carrier arms in selected adjusted positions.

2. A roller box tool as defined in claim 1, wherein:
    a. said inner surfaces of said slots all converge toward each other, relative to the horizontal centerline of the box tool at identical angles.

3. A roller box tool for use with machine tools, comprising:
    a. a cylindrical body having an axial bore therethrough;
    b. a tubular shaft operatively mounted on the rear end of said cylindrical body;
    c. a plurality of roller carrier arms slidably mounted on the front end of said body in circumferentially spaced apart slots which have inner surfaces that converge toward each other at a predetermined angle, and on which said carrier arms are supported;
d. at least one tool bit carrier arm slidably mounted on the front end of said body in a slot circumferentially spaced from said roller carrier arm slots, and which last named slot has an inner surface that converges towards the inner surfaces of said first named slots and on which is slidably mounted said tool carrier arm;
e. Each of said roller carrier arms having rotatably mounted on the outer end thereof a workpiece engaging roller, and said tool bit carrier arm having a tool bit adjustably mounted on the outer end thereof;
f. means operatively mounted on said shaft for radially adjusting said carrier arms inwardly and outwardly relative to the horizontal centerline of the box tool to adjust the rollers and tool bit for cutting various diameters on workpieces;
g. means for locking said carrier arms in selected adjusted positions,
h. said inner surfaces of said slots all converge toward each other, relative to the horizontal centerline of the box tool at identical angles; and,
i. said inner surfaces of said slots each are disposed at an angle relative to the horizontal centerline of the box tool of 26° 34 minutes.

4. A roller box tool as defined in claim 1, wherein said means operatively mounted on said shaft for adjusting said carrier arms comprises:
a. an adjusting spool threadably mounted on said shaft and operatively connected to said carrier arms;
b. a micrometer barrel and dial member carried on said spool and being provided with measurement indicia on the dial; and,
c. a vernier ring attached to said body and disposed adjacent said dial and being provided with measurement indicia which coacts with the indicia on said dial to indicate the adjusted positions of said tool bit and rollers when said barrel and dial member is manually rotated.

5. A roller box tool as defined in claim 1, wherein said means for locking said carrier arms in selected adjusted positions comprises:
a. a clamping ring threadably mounted on said body and being adapted to engage said carrier arms and clamp them in said selected adjusted positions.

* * * * *